US007003078B2

(12) United States Patent
Starr et al.

(10) Patent No.: US 7,003,078 B2
(45) Date of Patent: Feb. 21, 2006

(54) METHOD AND APPARATUS FOR TELEPHONE LINE TESTING

(75) Inventors: Thomas J. J. Starr, Barrington, IL (US); Carlton L. Brown, Danville, CA (US)

(73) Assignee: SBC Knowledge Ventures, LP, Reno, NV (US)

( * ) Notice: Subject to any disclaimer, the term of this patent is extended or adjusted under 35 U.S.C. 154(b) by 0 days.

(21) Appl. No.: 10/200,669

(22) Filed: Jul. 22, 2002

(65) Prior Publication Data

US 2003/0021388 A1 Jan. 30, 2003

Related U.S. Application Data

(63) Continuation-in-part of application No. 09/239,591, filed on Jan. 29, 1999, now abandoned.

(51) Int. Cl.
*H04M 1/24* (2006.01)
*H04M 3/08* (2006.01)
*H04M 3/22* (2006.01)

(52) U.S. Cl. ................ 379/27.01; 379/1.04; 379/22.02

(58) Field of Classification Search ............... 379/1.01, 379/1.03, 1.04, 22.02, 27.01, 27.03, 22.03, 379/26.02, 27–29
See application file for complete search history.

(56) References Cited

U.S. PATENT DOCUMENTS 4,989,202 A * 1/1991 Soto et al. .................. 370/244
5,515,398 A 5/1996 Walsh et al.
5,778,050 A * 7/1998 Park, II ........................ 379/21
5,805,669 A * 9/1998 Bingel et al. ................. 379/28
6,002,671 A * 12/1999 Kahkoska et al. .......... 370/248
6,014,425 A * 1/2000 Bingel et al. ............ 379/26.02
6,014,435 A * 1/2000 Rosen ........................ 379/200
6,067,646 A 5/2000 Starr
6,091,713 A * 7/2000 Lechleider et al. ......... 370/248
6,111,936 A 8/2000 Bremer
6,292,468 B1 * 9/2001 Sanderson .................. 370/241
6,366,644 B1 * 4/2002 Sisk et al. ................. 379/1.04
6,385,297 B1 * 5/2002 Faulkner et al. ........... 379/1.04
6,643,266 B1 * 11/2003 Pugaczewski ............... 370/249
6,891,803 B1 * 5/2005 Chang et al. ............... 370/252

* cited by examiner

*Primary Examiner*—Barry W Taylor
(74) *Attorney, Agent, or Firm*—Toler, Larson & Abel, LLP

(57) ABSTRACT

A method and apparatus for qualifying a telephone transmission line for XDSL communication services is disclosed. The system includes a modem, located at the customer premises to be connected. The modem analyzes actual signals to determine the electrical characteristics of the communication channel associated with the customer premises. The modem includes a transmitter, receiver and controller to generate test signals and receive responses. The modem then analyzes the data to generate an output value indicative of the electrical characteristics of the communication channel being tested. This output value is then displayed to a user or transmitted over the communication channel to a network. The system thereby eliminates the necessity of dispatching a technician to test the telephone line, and provides more accurate test results than those achievable at the network-side of the connection alone.

25 Claims, 3 Drawing Sheets

METHOD AND APPARATUS FOR TELEPHONE LINE TESTING

RELATED APPLICATIONS

This is a Continuation-In-Part Application of U.S. application Ser. No. 09/239,591 filed on Jan. 29, 1999 now abandoned.

TECHNICAL FIELD

This invention relates generally to telephone line testing and more particularly to a method and apparatus for qualifying a customer node of a public switched telephone network for digital communications services.

BACKGROUND OF THE INVENTION

The characteristics of telephone lines vary greatly. Typical telephone lines connecting a customer premises to a public switch telephone network (PSTN) vary in terms of length, wire gauge, amount of bridged tap, background noise, loading coils, and other aspects. In addition, faults may be present along the telephone lines such as: a short circuit, an open circuit, conductor leakage, a short circuit to a power line, or induction interference from a power line. The operation and communications integrity of loop transmission systems depends on the telephone line characteristics. Loop transmission systems include a plain old telephone system (POTS), and digital subscriber line services such as an integrated services digital network (ISDN), high speed digital subscriber line (HDSL), very high speed digital subscriber line (VDSL), or asymmetric digital subscriber line (ADSL). These digital subscriber line services are commonly referred to as XDSL services.

Because the integrity of XDSL communications services depend on the quality of the transmission line connection, it is desirable to test the telephone line connecting a customer premises to the PSTN to determine whether the telephone line will support the desired transmission service. It is also desirable to test the line to diagnose the source of transmission faults or interference.

Presently, two methods are commonly employed to test telephone transmission lines: (1) central office or remote terminal automated line test systems, and (2) a dispatched technician with a hand-held test set. In the first case, a line test command is sent from a centralized loop maintenance system to a network terminating node (NTN) such as a local telephone switch or carrier system located in a central office or remote equipment site. In response, the NTN connects the line to be tested through a series of relays to a system that performs electrical measurements of the telephone transmission line. The results of these measurements are then reported back to the loop maintenance system.

In the second case, a technician is dispatched to connect a hand-held test set to the telephone transmission line to be tested at one of the following locations: (1) the central office main distributing frame, (2) the network interface device (NID) at the customer node, or (3) an intermediate point such as a serving area interface point. Using the hand-held test set, the technician measures the electrical characteristics of the line and reports the results of the test to the loop maintenance center. In either case, the electrical characteristics of the line are known, and a determination can then be made as to the type of digital communications services the telephone transmission line will support.

There are several shortcomings, however, with the present methods for qualifying telephone transmission lines for digital communication services. In the first case, transmission loops served from some network terminating nodes, such as digital subscriber line access multiplexers and digital loop carrier systems, may not provide metallic test access to the telephone transmission line or the line measurement unit. In the case where telephone service is not yet activated, the telephone transmission line may not be connected to an NTN at all. In these situations, it would not be possible to perform an automated line test from the network-end of the line. Furthermore, transmission loops which are connected to an NTN with a metallic test bus and a line measurement unit, may only respond to test frequencies within the sub-4 kHz band due to bandwidth limitations of the test bus or the line measurement unit. In addition, background interference noise at the customer node may be difficult to observe with testing equipment located only at the NTN.

Dispatching a technician to test the telephone transmission line has the obvious shortcoming of increasing the time and expense to provide digital communication services to customers. This results from the need for personnel to perform these tests, and the need to provide technicians with testing equipment.

The present invention overcomes the shortcomings of present telephone transmission line testing methods by providing a modem at the customer premises for testing and qualifying the customer connection to the PSTN for XDSL communication services.

BRIEF DESCRIPTION OF THE DRAWINGS

For a more complete understanding of the invention, reference should now be had to the embodiments illustrated in greater detail in the accompanying drawings and described below by way of examples of the invention.

In the drawings.

DETAILED DESCRIPTION OF THE PREFERRED EMBODIMENT(S)

Figure 1:
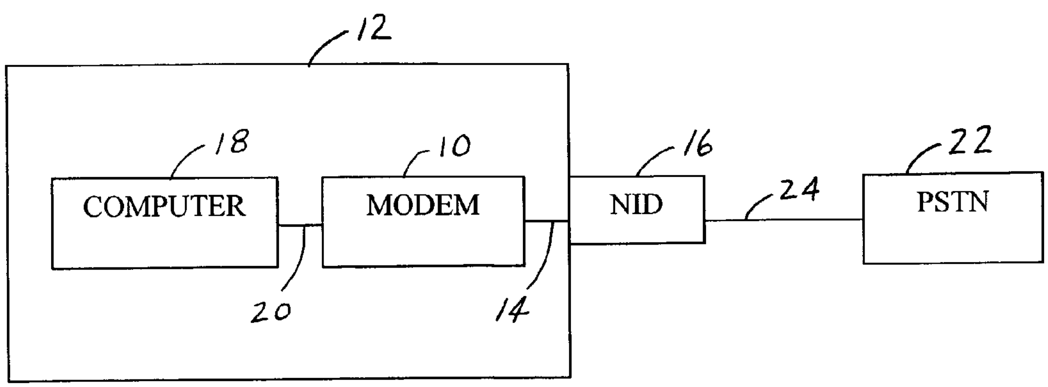
FIG. 1 is a schematic block diagram of one embodiment of the present invention used in connection with a computer located at a customer premises.

Referring to FIG. 1, there is shown a schematic block diagram of an embodiment of the present method of testing a telephone transmission line. The system shown in FIG. 1 comprises a modem 10 located at the customer premises 12 which is connected by way of transmission line 14 to the network interface device 16 at the customer premises 12. Transmission line 14 will typically comprise the modem line connected to a common telephone wall jack, and associated wiring from the wall jack to the network interface device 16. Alternatively, transmission line 14 can comprise the modem line connected directly into the network interface jack in the NID 16. It is contemplated that the modem 10 will typically be part of a digital communications device such as a computer 18 or will be connected to such a device as shown in FIG. 1 by transmission line 20. XDSL modems are commonly included in today's personal computer systems. Unlike customer-end XDSL modems to date, however, modem 10 includes wideband loop testing and reporting functions. Between the network interface device 16 at the customer premises 12 and the public switch telephone network (PSTN) 22, is the telephone transmission line 24 to be tested. Of course, the PSTN could also represent a digital network.

Computer 18 is shown as part of a representative digital communications system at a customer premises 12. The modem 10 is typically a necessary part of computer 18 which allows computer 18 to transmit and receive digital signals over telephone transmission line 24. For purposes of line testing, however, computer 18 is not necessary if modem 10 is equipped with a user interface for displaying the results of the telephone transmission line test. It is to be understood that computer 18 is shown for illustration purposes and could be interchanged, for example, with other equipment that generates a communications signal to be sent over the telephone transmission line 24.

Figure 2:
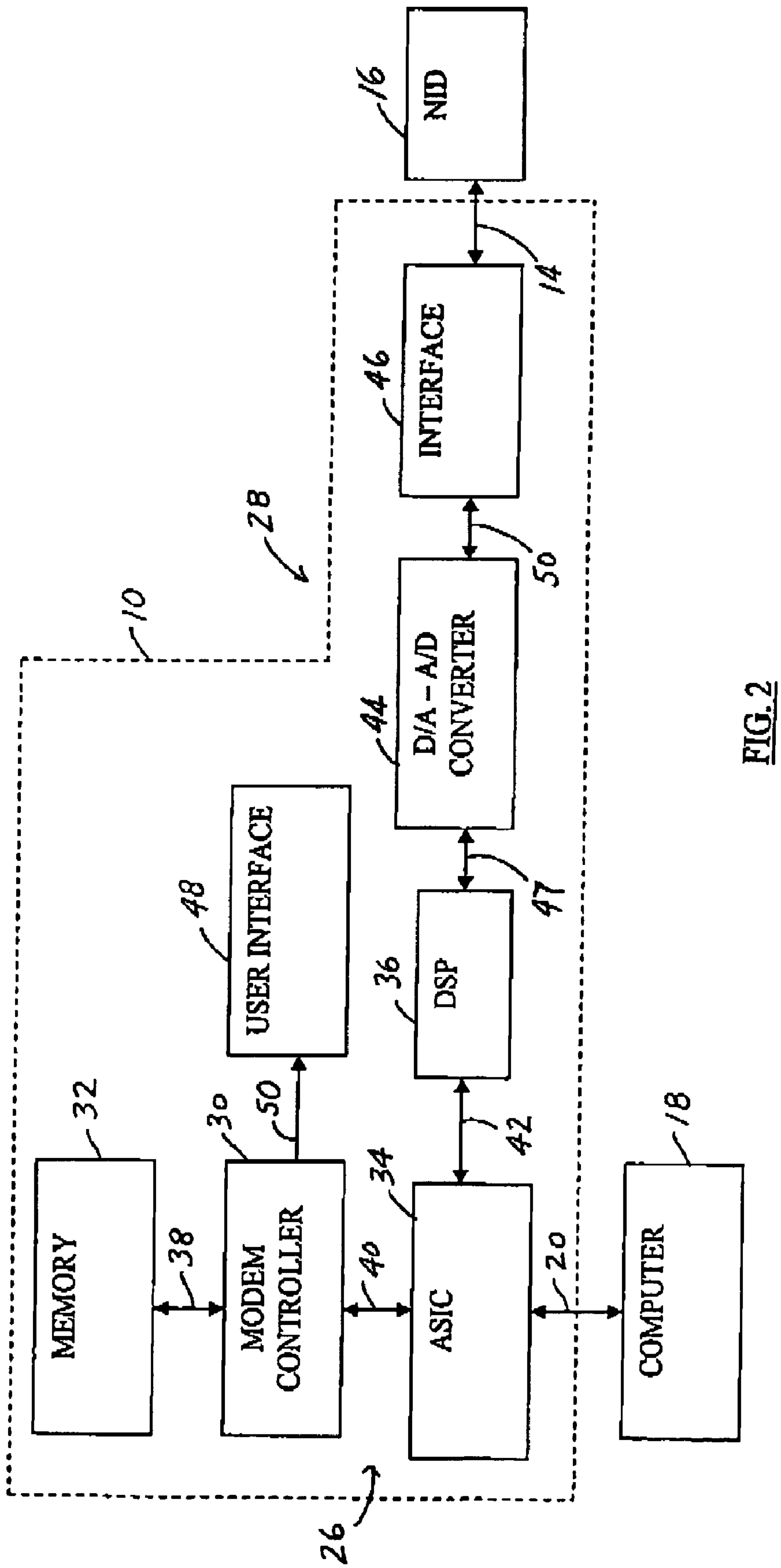
FIG. 2 is a schematic block diagram of one embodiment of the modem for use in the telephone line testing scenario of FIG. 1.

Referring to FIG. 2, an embodiment of the modem 10 comprises a transmitter/receiver 26 and direct access arrangement (DAA) 28. The transmitter/receiver 26 includes a modem controller 30 such as a microprocessor, associated memory 32, application specific integrated circuit (ASIC) 34, and a digital signal processor (DSP) 36. These components communicate along signal paths 38, 40 and 42.

The direct access arrangement 28 includes a digital-to-analog (D/A) and analog-to-digital (A/D) converter 44 and telephone interface circuitry 46. The converter 44 communicates with the DSP 36 and interface 46 along signal paths 47 and 50, respectively. The interface 46 transmits signals to and receives signals from the network interface device 16 along transmission line 14.

The modem controller 30, memory 32, ASIC 34, and DSP 36 define a transmitter for generating test signals on telephone transmission line 24. Modem controller 30, memory 32, ASIC 34 and DSP 36 also define a receiver for detecting signals in response to test signals transmitted to telephone transmission line 24.

The connection and operation of the components thus far described in modem 10 are well known.

In addition, modem 10 preferably includes a user interface 48 in communication with modem controller 30 along signal line 50 for displaying the telephone transmission line test results to a user.

In operation, customers who desire DSL 20 services would connect the modem 10 to a wall jack at the customer premises or the network interface jack in the network interface device 16. The modem 10 performs a series of telephone line tests to qualify the line for its desired use and/or to diagnose the source of transmission interference. The test results are presented to the user by the user interface 48 or, alternatively, can be transmitted to, for example, computer 18 for display, or along transmission line 24 to a communications service provider. In this manner, the telephone transmission line 24 can be pre-qualified for the desired communications service.

To display an output indicative of the electrical characteristics of telephone transmission line 24, the modem 10 performs a series of tests. The testing sequence and logic is stored in memory 32 and executed by modem controller 30 in cooperation with transmitter/receiver 26 and DAA 28. The following functions are carried out by the modem 10 in qualifying the telephone transmission line 24. One function is line monitoring which consists of measuring background noise power in one or more frequency bands in a frequency range of approximately 0 Hz to 5 MHz. Another function is measurement of AC or DC voltage between the tip and ring, tip and ground, and ring and ground terminals of the telephone transmission line 24. Stimulus and response testing is also performed by the modem 10 in the form of transmitting test tones, receiving response signals in response to the test tones, and analyzing the amplitude and phase of the signal reflections from the transmission line 24. Additionally, modem 10 transmits test pulses, receives response signals in response to the test pulses, and analyzes the amplitude and delay of the pulse reflections from the transmission line 24. Additional functionality includes measurement of resistance between the tip and ring, tip and ground, and ring and ground terminals of transmission line 24, as well as measurement of the capacitance between the tip and ring terminals of transmission line 24.

Depending upon the communication service desired by the customer, a series of measurements could be performed with some of the tests performed more than once, or not at all, depending on the system configuration or the results of earlier tests. In addition, or alternatively, during a test sequence, the end-user could be instructed by the modem controller 30 via the user interface 48 to perform certain actions such as to place telephones on or off hook.

At the conclusion of the sequencing and 15 analysis, a transmission line quality value is developed as a function of the test results.

One scenario for deriving the line quality value is as follows. The user is asked to indicate the type of DSL transmission system for which the line analysis is being performed. For example: HDSL, ADSL, or ISDN. From this, assumptions are made for the typical transmitted frequency band(s), signal power, modulation method, and coding, among other things.

The broadband attenuation of the line is estimated by applying a voltage step to the line 24 and measuring the time-constant of the resulting current flow. The time-constant estimates the line capacitance, from which the line length is inferred. The estimation of the broadband attenuation could further be refined by applying a short voltage pulse to the line and measuring the number and amplitude of the observed echoed pulses. From these pulses, the presence of bridged taps can be ascertained. An additional attenuation allowance would then be made for each bridged tap. By applying a single or multiple tone frequency sweep to the line and observing the reflected signals, nonlinear distortion and the presence of a loading coil can also be detected. In addition, the background line noise would be preferably measured in one or more frequency bands. If the line response indicates the presence of a loading coil, then the line is not suitable for broadband DSL service. This would be indicated to the user or service-provider.

With knowledge of the nominal transmitted signal power and the estimated line attenuation from the measurements mentioned above, the received signal power is predicted. The noise power is predicted from the measured background noise, and the measured nonlinear distortion. A predicted signal-to-noise ratio (SNR) value is then estimated. For a known transmission method (modulation type, transmit power, coding type, bandwidth) the achievable bit-rate is derived from the SNR. For asymmetric transmission systems (such as ADSL), a SNR estimate is derived separately for the upstream and downstream directions. Thus, a separate bit-rate capacity estimate is provided for each direction of transmission.

This bit-rate capacity is then represented as a line quality value which is then displayed to the end user by way of the user interface 48. The customer could then relay the line test results to the communications service provider. Alternatively, the test results could be transmitted to the service provider over transmission line 24.

With the preferred implementation of the line testing method, line testing would be performed in a single-ended manner. In other words, the test is conducted at the customer premises only, and no testing equipment is required at the other end of telephone transmission line 24. Of course, as an alternative implementation, a double-ended test could be performed involving coordinating testing functions at both the customer end of telephone transmission line 24 and the network end of telephone transmission line 24. In the double-ended testing scenario, test signals can be transmitted and received by the modem 10 and the PSTN 22.

The testing procedures described above can be initiated by either the end user at the customer premises or by way of an initiation message from the service provider or the local network provider via the DSL path or dial-up voice band modem connection.

Figure 3:
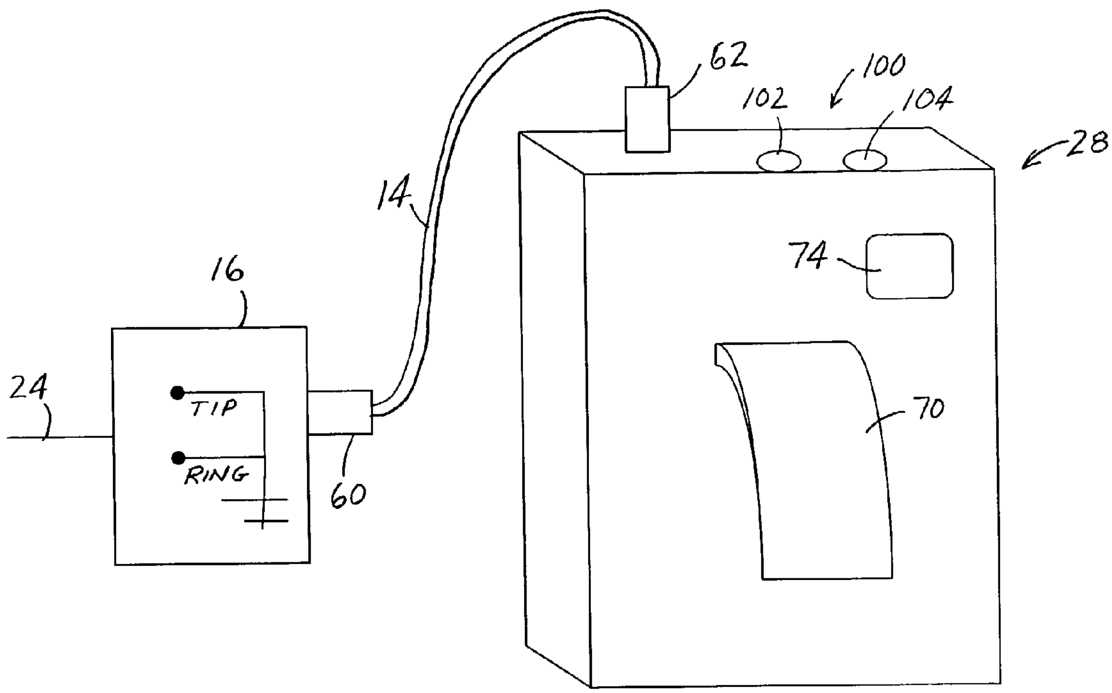
FIG. 3 is a perspective view of one embodiment of a direct access arrangement testing device according to the present invention.

Referring now to FIG. 3, there is shown a perspective view of one embodiment of a direct access arrangement device 28 according to the present invention. The device is a hand-held test set, connected by way of a transmission line 14 to a network interface device (NID) 16 at the customer premises. In the example shown in FIG. 3, the transmission line is a standard telephone line with RJ-11 connectors 60, 62 for connecting to the NID 16 and PSTN by way of the telephone transmission line 24. If the device is being used at the network central office, a different type of communication cable may be used to interface with the main distribution frame (MDF) or switch location associated with a particular customer's loop.

The test set is small in size and can be hand-held. For example, the set may be 7×4×2 inches or less. For easy portability, a belt-clip 70 can be affixed to one side of the device. Preferably, the device is battery powered, and activated with a power switch 74 after connection. The user interface 100 includes two indicators such as LEDs 102, 104 which preferably can each indicate red or green and can flash on and off or be lit continuously.

In operation, the test set qualifies a customer loop for XDSL communications, the loop being from between the ADSL termination unit-remote (ATU-R) to the ATU-Central Office (ATU-C). Once connected, the test set performs at least several of the line tests discussed above, including attempting to synchronize as an ADSL modem. The test set is capable of inter-operating with the Alcatel 1000 and/or Cisco 6100 digital subscriber loop access multiplexers (DSLAMs), for example.

Upon power-up, LED 104 indicates that initialization is complete and power is sufficient (solid green light), power is low (flashing green light), or that the set has failed its power-up initialization tests (solid or flashing red light). If power-up is successful, the test set continues into the testing phase. At least several of the tests outlined above are performed including testing for an open circuit on either the tip or ring terminal. That is, tip to ground, ring to ground and tip to ring voltages are determined. During the testing phase, while the unit is performing the tests, LED 102 is blinking green to indicate that the unit is active. If all of the tests are successful and the unit has determined that the customer loop qualifies for XDSL communications, LED 102 is activated to be solid green. If the tests have failed, the indicator is activated as a solid or flashing red light. However, if the open circuit test has failed, i.e., there is insufficient voltage detected between the tip and ring circuits, the indicator alternates flashing green and red. The alternating green/red signal thus indicates a possible open loop on the customer circuit. If the open loop issue is resolved, the customer loop may still qualify for XDSL communications services. In this way, the test unit acts as a go/no-go gauge for qualifying a customer loop either at the customer premises, or at the central office. When performed at the customer premises, the unit may communicate either the test passed, test failed, or test failed with possible open loop results to the central office.

The hand-held test set of FIG. 3 thus provides a simple, effective device for qualifying a customer loop for XDSL communication services. Of course, the user interface could take many forms, and others are contemplated by the present invention. Preferably, however, the interface should communicate at least whether the test has passed or failed and whether a possible open circuit condition exists. One indication could accomplish this by a solid, slow blinking and fast blinking signal, respectively, for example. The test set of FIG. 3 qualifies the customer loop by indicating whether the customer modem will be able to synchronize with the network. It does not test for optimum communications rates.

While the invention has been described in connection with one or more embodiments, it is to be understood that the invention is not limited to these embodiments. On the contrary, the invention covers all alternatives, modifications and equivalents as may be included within the scope and spirit of the appended claims.

What is claimed is:

1. A customer-operable modem, associated with a customer premises, for analyzing electrical signals to determine the characteristics of a broadband communication channel between a service provider and said customer premises, said modem comprising:

a transmitter connected to said broadband communication channel for delivering signals to said broadband communication channel;

a receiver connected to said broadband communication channel for receiving response signals from said broadband communication channel;

a modem user interface; and a modem controller having an associated memory with a testing sequence pre-stored therein, said modem controller in operative communication with said transmitter and said receiver and said modem user interface, said modem controller programmed to execute said testing sequence so as to:

command said transmitter to generate test signals and deliver said test signals onto said broadband communication channel to thereby stimulate said broadband communication channel from said customer premises;

measure response signals received by said receiver that are generated solely in response to stimulated effects of said test signals on said broadband communication channel;

generate an output value as a function of said test signals and said response signals indicative of the electrical characteristics of said broadband communication channel;

transmit said output value to said modem user interface so as to display said output value; and transmit said output value over said broadband communication channel to said communications service provider to eliminate the need for a technician dispatch to said premises, wherein said output value is capable of being utilized for qualifying said broadband communication channel for XDSL communication services.

2. The modem of claim 1 wherein said broadband communication channel is a telephone line adapted for XDSL service and said modem controller is programmed to execute said testing sequence so as to:

command said transmitter to generate test signals having a frequency range from approximately 0 Hz to 5 MHz to stimulate said telephone line;

measure the amplitude, phase, and delay of response signals received by said receiver in response to said test signals; and generate an output value as a function of said test signals and said response signals indicative of the electrical characteristics of said telephone.

3. The modem of claim 2 wherein said modem further comprises a display in communication with said modem controller for displaying said output value.

4. The modem of claim 2 wherein said modem controller is further programmed to transmit said output value to a user interface for displaying said output value to a user.

5. The modem of claim 2 wherein said modem controller is further programmed to measure at least two line voltages associated with said telephone line.

6. The modem of claim 2 wherein said modem controller is further programmed to measure background noise in at least one frequency band between approximately 0 Hz and 5 MHz.

7. The modem of claim 2 wherein said modem controller is further programmed to measure at least two resistance values associated with said telephone line.

8. The modem of claim 2 wherein said modem controller is further programmed to measure a capacitance value associated with said telephone line.

9. At a customer node of a public switched telephone network comprising a telephone line associated with a customer premises, a method of qualifying said customer node for broadband digital subscriber line communication services from a service provider without the need for a technician dispatch to said customer node, said customer node having a customer-operable modem connected to said telephone line at said customer premises, said method comprising the steps of:

utilizing a controller within said modem to initiate execution of a testing sequence pre-stored within a memory associated with said controller;

utilizing said modem in accordance with said testing sequence to transmit a first plurality of test signals from said customer premises and onto said telephone line within a frequency range of approximately 0 Hz to 5 MHz;

measuring a second plurality of response signals with said modem received in response to reflections of said first plurality of test signals on said telephone line;

generating an output value as a function of said first plurality of test signals and said second plurality of response signals indicative of the electrical characteristics of said customer node;

displaying said output value on a user interface of said modem;

transmitting said output value over said telephone line to said service provider; and utilizing said output value for qualifying said customer node along with said telephone line for broadband digital subscriber line communication services.

10. The method of claim 9 further comprising the step of transmitting said output value to a user interface for displaying said output value to a user.

11. The method of claim 9 further comprising the steps of:

measuring a third plurality of response signals with said modem received in response to test signals transmitted across said public switched telephone network; and generating an output value as a function of said first plurality of test signals, said second plurality of response signals, and said third plurality of test signals Indicative of the electrical characteristics of said customer node.

12. The method of claim 11 further comprising the step of transmitting said output value to a user interface for displaying said output value to a user.

13. At a customer node of a public switched telephone network comprising a customer-operable XDSL modem at said customer node connected to a telephone line, a method of qualifying said customer node for broadband digital subscriber line communication services from a service provider without the need for a technician dispatch to said customer node, said method comprising the steps of:

utilizing a controller within said modem to initiate execution of a testing sequence pre-stored within a memory associated with said controller;

utilizing said modem in accordance with said testing sequence to generate test signals having frequencies within a frequency range of approximately 0 Hz to 5 MHz at said customer node;

delivering said test signals onto said telephone line;

generating a first plurality of values as a function of the amplitude, phase, and delay of response signals received in response to reflections of said test signals on said telephone line;

generating a second plurality of values indicative of line voltages associated with said telephone line;

generating a third plurality of values indicative of resistance associated with said telephone line;

generating a fourth plurality of values indicative of capacitance values associated with said telephone line;

generating a fifth value indicative of the background noise in at least one frequency band between approximately 0 Hz and 5 Mhz;

generating an output value as a function of said first, second, third, fourth, and fifth values indicative of the electrical characteristics of said customer node;

displaying said output value on a user interface of said modem;

transmitting said output value over said telephone line to said service provider; and utilizing said output value for qualifying said customer node along with said telephone line for broadband digital subscriber line communication services.

14. A portable hand-held test set apparatus for analyzing electrical signals to qualify a broadband communication channel between a service provider and a customer premises for XDSL communication services, said apparatus comprising:

a modem programmed to generate test signals, deliver said test signals onto said broadband communication channel to Thereby stimulate said broadband communication channel from said customer premises, measure response signals that are generated solely in response to stimulated effects of said test signals on said broadband communication channel, measure a line voltage associated with said broadband communication channel, and generate an output value as a function of said test signals, response signals, and line voltage, said output value indicating either a line pass or a line fail for the purpose of qualifying said broadband communication channel for XDSL communication services;

a user interface in communication with said modem and comprising at least one indicator activated to indicate said output value; and means for selectively connecting said modem to a network interface device associated with said broadband communication channel at said customer premises;

whereby said portable hand-held test set apparatus is capable of being both situated and operated exclusively at said customer premises, at the option of a user, for qualifying said broadband communication channel for XDSL communication services.

15. The apparatus according to claim 14 wherein said broadband communications channel comprises a telephone line having tip and ring connections, and said line voltage is between said tip and ring connections.

16. The apparatus according to claim 14 wherein said user interface comprises an LED activated green to indicate a line pass output value and activated red to indicate a line fail output value.

17. The apparatus according to claim 14 wherein said output value includes indicating an open circuit.

18. A hand-held testing apparatus for qualifying a customer telephone line for XDSL communication services, said apparatus comprising:

a modem for connecting to said customer telephone line, said modem programmed to generate a plurality of test signals, transmit said plurality of test signals from a customer premises and onto said customer telephone line within a frequency range of approximately 0 Hz to 5 MHz, measure a plurality of response signals in response to reflections of said plurality of test signals on said customer telephone line, measure a line voltage between a tip and ring connection associated with said customer telephone line, and generate an output value as a function of said response signals and said line voltage;

a user interface in communication with said modem and comprising at least one indicator for communicating said output value to a user, wherein said output value indicates either a line pass or a line fail result for the purpose of qualifying said customer telephone line for XDSL communication services; and means for selectively connecting said modem to a network interlace device associated with said broadband communication channel at said customer premises;

whereby said hand-held testing apparatus is capable of being both situated and operated exclusively at said customer premises, at the option of said user, for qualifying said customer telephone line for XDSL communication services.

19. The apparatus according to claim 18 wherein said user interface comprises an LED activated green to indicate a line pass output value and activated red to indicate a line fail output value.

20. The apparatus according to claim 18 wherein said output value includes an open circuit result indicating an insufficient line voltage.

21. The apparatus according to claim 20 wherein said user interface is adapted to indicate an open circuit result.

22. The apparatus according to claim 18 wherein said user interface comprises at least two LEDs, one of said LEDs indicating a power status of said apparatus, and another of said LEDs indicating said output value.

23. The apparatus according to claim 18 wherein said apparatus is housed in a container smaller than approximately 7 inches in length by 4 inches in width by 2 inches in depth.

24. The apparatus according to claim 23 wherein said container includes a belt clip on an exterior side.

25. The apparatus according to claim 23 wherein said apparatus is battery operated.

* * * * *